United States Patent
Burrell et al.

(10) Patent No.: US 10,843,558 B2
(45) Date of Patent: Nov. 24, 2020

(54) VISCOUS COUPLING AND POWER TAKE OFF ASSEMBLY FOR A DRIVE TRAIN SYSTEM

(71) Applicant: Parker-Hannifin Corporation, Cleveland, OH (US)

(72) Inventors: John William Burrell, Olive Branch, MS (US); William J. Barton, Bartlett, TN (US); Christopher Frederick Heuer, Jr., Hernando, MS (US)

(73) Assignee: Parker-Hannifin Corporation, Cleveland, OH (US)

( * ) Notice: Subject to any disclaimer, the term of this patent is extended or adjusted under 35 U.S.C. 154(b) by 129 days.

(21) Appl. No.: 16/072,274

(22) PCT Filed: Jan. 30, 2017

(86) PCT No.: PCT/US2017/015551
§ 371 (c)(1),
(2) Date: Jul. 24, 2018

(87) PCT Pub. No.: WO2017/132644
PCT Pub. Date: Aug. 3, 2017

(65) Prior Publication Data
US 2019/0031024 A1    Jan. 31, 2019

Related U.S. Application Data

(60) Provisional application No. 62/288,225, filed on Jan. 28, 2016.

(51) Int. Cl.
*B60K 17/28* (2006.01)
*B60K 25/06* (2006.01)
(Continued)

(52) U.S. Cl.
CPC .............. *B60K 17/28* (2013.01); *B60K 25/06* (2013.01); *F16D 1/116* (2013.01);
(Continued)

(58) Field of Classification Search
CPC ....................................................... B60K 17/28
See application file for complete search history.

(56) References Cited

U.S. PATENT DOCUMENTS 6,497,313 B1 * 12/2002 Blalock .................. B60K 17/28
192/18 A
7,159,701 B2 * 1/2007 Graves .................... A01B 71/06
192/12 C
(Continued)

FOREIGN PATENT DOCUMENTS

DE   102006061343 A1   6/2008
DE   102008008508 A1   10/2008
(Continued)

OTHER PUBLICATIONS

International Search Search Report, Application No. PCT/US2017/015551, dated Jun. 12, 2017.

*Primary Examiner* — Nicole T Verley
(74) *Attorney, Agent, or Firm* — MacMillan, Sobanski & Todd, LLC (57) ABSTRACT

A drive train system includes a source of rotational energy, a viscous coupling and power take off assembly that is rotatably driven by the source of rotational energy, and a rotatably driven device that is rotatably driven by the viscous coupling and power take off assembly. The viscous coupling and power take off assembly may include a power take off that is rotatably driven by the source of rotational energy and a viscous coupling that is rotatably driven by the power take off. Alternatively, the viscous coupling and power take off assembly may include a viscous coupling that is rotatably driven by the source of rotational energy and a
(Continued)

power take off that is rotatably driven by the viscous coupling. Lastly, the viscous coupling and power take off assembly may include a combined viscous coupling and power take off assembly that is integrated into a single housing.

14 Claims, 8 Drawing Sheets

(51) Int. Cl.
     *F16D 1/116*      (2006.01)
     *F16F 15/16*      (2006.01)

(52) U.S. Cl.
     CPC ............... *B60K 2025/065* (2013.01); *F16D 2500/10437* (2013.01); *F16F 15/161* (2013.01)

(56) References Cited

U.S. PATENT DOCUMENTS

| | | | |
|---|---|---|---|
| 8,196,726 B2* | 6/2012 | Bradley | F16D 35/005 |
| | | | 192/58.3 |
| 8,452,504 B2* | 5/2013 | Dickinson | F16H 61/702 |
| | | | 180/65.28 |
| 9,157,487 B2* | 10/2015 | Alford | B60K 17/28 |
| 2006/0214035 A1 | 9/2006 | Albright et al. | |
| 2017/0072793 A1* | 3/2017 | Blalock | B60K 17/28 |

FOREIGN PATENT DOCUMENTS

| | | | |
|---|---|---|---|
| GB | 2219647 A | 12/1989 | |
| GB | 2277791 A | 9/1994 | |

* cited by examiner

FIG. 10 ured energy to the rotatably driven accessory.

VISCOUS COUPLING AND POWER TAKE OFF ASSEMBLY FOR A DRIVE TRAIN SYSTEM

BACKGROUND OF THE INVENTION

This invention relates in general to power take offs for transmitting rotational energy from a source of rotational energy to a rotatably driven accessory. In particular, this invention relates to an improved structure for a viscous coupling and power take off assembly that minimizes the transmission of torque transients therethrough from the source of rotational energy to the rotatably driven accessory.

A power take off is a well known mechanical device that is often used in conjunction with a source of rotational energy, such as a vehicle engine or transmission, to transfer rotational energy to a rotatably driven accessory, such as a hydraulic pump that is supported on the vehicle. For example, power take offs are commonly used on industrial and agricultural vehicles to transfer rotational energy from the vehicle engine or transmission to one or more hydraulic pumps that, in turn, are used to operate hydraulically driven accessories provided on the vehicle, such as plows, trash compactors, lifting mechanisms, winches, and the like. The power take off provides a simple, inexpensive, and convenient means for transferring energy from the source of rotational energy to the hydraulic pump that, in turn, transfers relatively high pressure fluid to operate the driven accessory.

A typical power take off includes a housing, an input mechanism, and an output mechanism. The power take off housing is adapted to be supported on a housing of the source of rotational energy. The power take off housing includes an opening that can be aligned with an opening provided in the housing of the source of rotational energy. The input mechanism of the power take off extends outwardly from the power take off housing through the aligned openings and into the housing of the source of rotational energy. In this manner, the input mechanism of the power take off is connected to the source of rotational energy so as to be rotatably driven whenever the source of rotational energy is operated. The output mechanism of the power take off is rotatably driven by the input mechanism and is adapted to be connected to the rotatably driven accessory. In some instances, the input mechanism of the power take off is directly connected to the output mechanism such that the rotatably driven accessory is operated whenever the source of rotational energy is operated. In other instances, a clutch assembly is provided between the input mechanism and the output mechanism such that the rotatably driven accessory is operated only when the clutch assembly is engaged while the source of rotational energy is operated.

It is important to control the operation of the power take off (both with and without a clutch assembly) so as to prevent damage from occurring to any or all of a drive train system, including the source of rotational energy, the power take off, and the rotatably driven accessory. Such damage can occur if relatively large torque transients (i.e., rotational shock loads) are generated within and transmitted through the drive train system from the source of rotational energy to the rotatably driven accessory. This can occur, for example, when the source of rotational energy is abruptly actuated or when the clutch assembly of the power take off is abruptly engaged to transmit rotational energy to the rotatably driven accessory. Preventing this situation from occurring is particularly important if the rotatably driven accessory has a relatively high inertial characteristic that resists sudden changes in rotational speed. Thus, it would be desirable to provide an improved structure for a drive train system that minimizes the transmission of torque transients therethrough from the source of rotational energy to the rotatably driven accessory.

SUMMARY OF THE INVENTION

This invention relates to an improved structure for a drive train system that includes a source of rotational energy, a viscous coupling and power take off assembly that is rotatably driven by the source of rotational energy, and a rotatably driven device that is rotatably driven by the viscous coupling and power take off assembly. The viscous coupling and power take off assembly may include a power take off that is rotatably driven by the source of rotational energy and a viscous coupling that is rotatably driven by the power take off. Alternatively, the viscous coupling and power take off assembly may include a viscous coupling that is rotatably driven by the source of rotational energy and a power take off that is rotatably driven by the viscous coupling. Lastly, the viscous coupling and power take off assembly may include a combined viscous coupling and power take off assembly that is integrated into a single housing.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
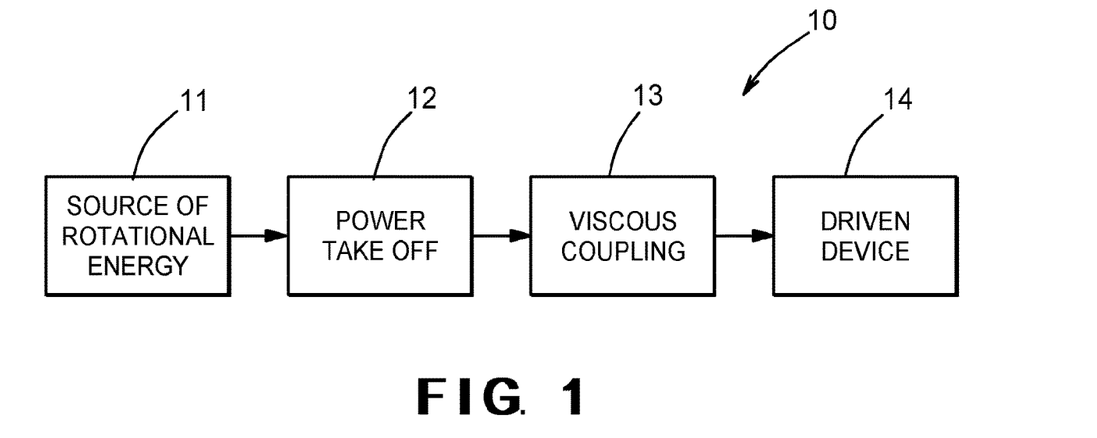
FIG. 1 is a block diagram of a first embodiment of a drive train system that includes a viscous coupling and power take off assembly in accordance with this invention.

Referring now to the drawings, there is illustrated in FIG. 1 a first embodiment of a drive train system, indicated generally at 10, in accordance with this invention. The first embodiment of the drive train system 10 includes a source of rotational energy 11 that is connected through an assembly of a power take off 12 and a viscous coupling 13 to drive a rotatably driven device 14. The source of rotational energy 11 is conventional in the art and may be embodied as any structure (such as a vehicular engine or transmission) that rotatably drives an output shaft, gear, or other member (not shown). In a manner that is described in detail below, the output shaft, gear, or other member of the source of rotational energy 11 is connected to an input mechanism (not shown) of the power take off 12. The structure and operation of the power take off 12 will also be described below. The power take off 12 also includes an output mechanism (not shown) that is connected to an input shaft, gear, or other member (not shown) of the viscous coupling 13. The structure and operation of the viscous coupling 13 will be described below. The viscous coupling 13 also includes an output shaft, gear, or other member (not shown) that is connected to rotatably drive the rotatably driven accessory 14.

Figure 2:
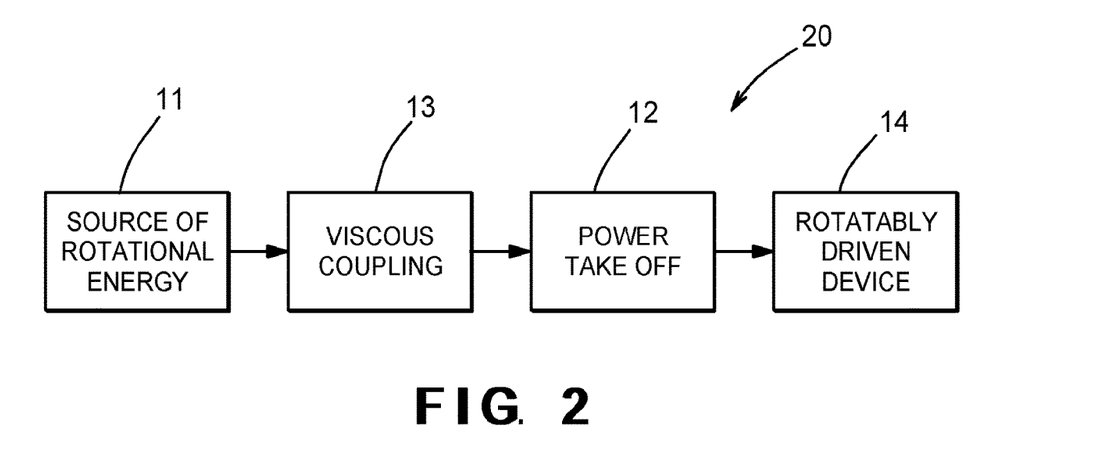
FIG. 2 is a block diagram of a second embodiment of a drive train system that includes a viscous coupling and power take off assembly in accordance with this invention.

FIG. 2 is a block diagram of a second embodiment of a drive train system, indicated generally at 20, in accordance with this invention. In the second embodiment of the drive train system 20, the output shaft, gear, or other member of the source of rotational energy 11 is connected to the input shaft, gear, or other member of the viscous coupling 13, the output shaft, gear, or other member of the viscous coupling 13 is connected to the input mechanism (not shown) of the power take off 12, and the output mechanism of the power take off 12 is connected to rotatably drive the rotatably driven accessory 14.

Figure 3:
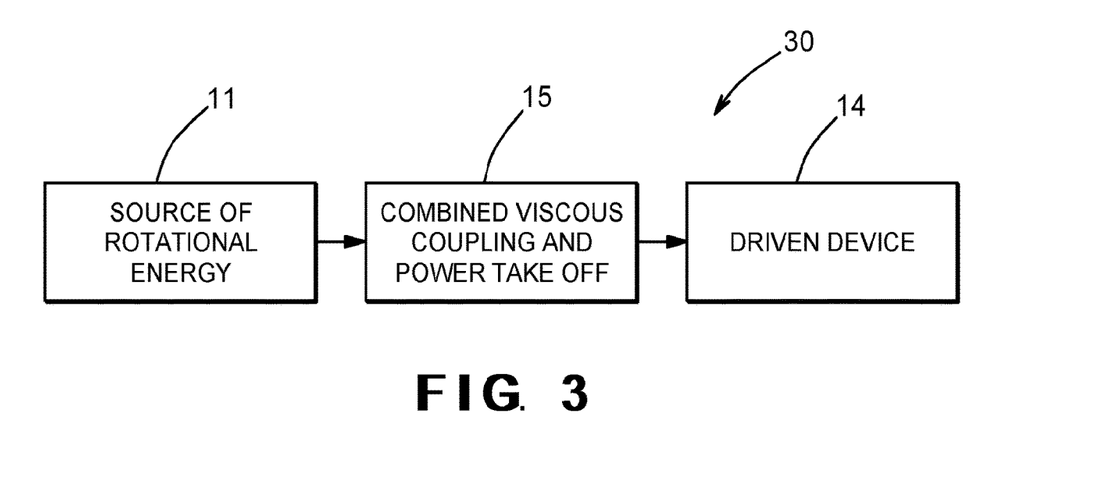
FIG. 3 is a block diagram of a third embodiment of a drive train system that includes a combined viscous coupling and power take off assembly in accordance with this invention.

FIG. 3 is a block diagram of a third embodiment of a drive train system, indicated generally at 30, in accordance with this invention. In the third embodiment of the drive train system 30, the output shaft, gear, or other member of the source of rotational energy 11 is connected through a combined viscous coupling and power take off assembly 15 to rotatably drive the rotatably driven accessory 14. The combined viscous coupling and power take off assembly 15 is preferably integrated into a single housing (not shown), but is otherwise similar to the first and second embodiments of the drive train system described and illustrated herein.

Figure 4:
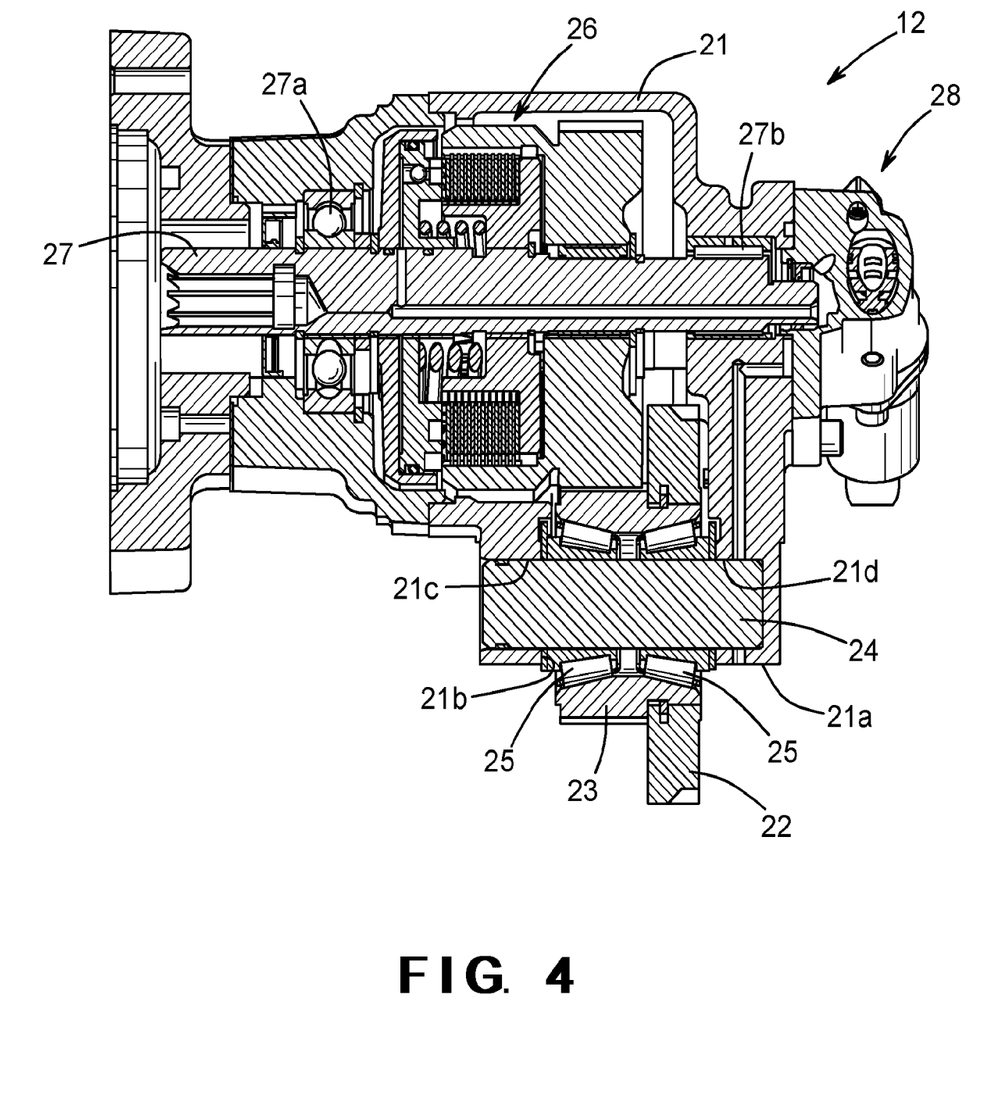
FIG. 4 is a sectional elevational view of an exemplary power take off of the viscous coupling and power take off assembly that can be used in the embodiments of the drive train system illustrated in FIGS. 1, 2, and 3.
Figure 5:
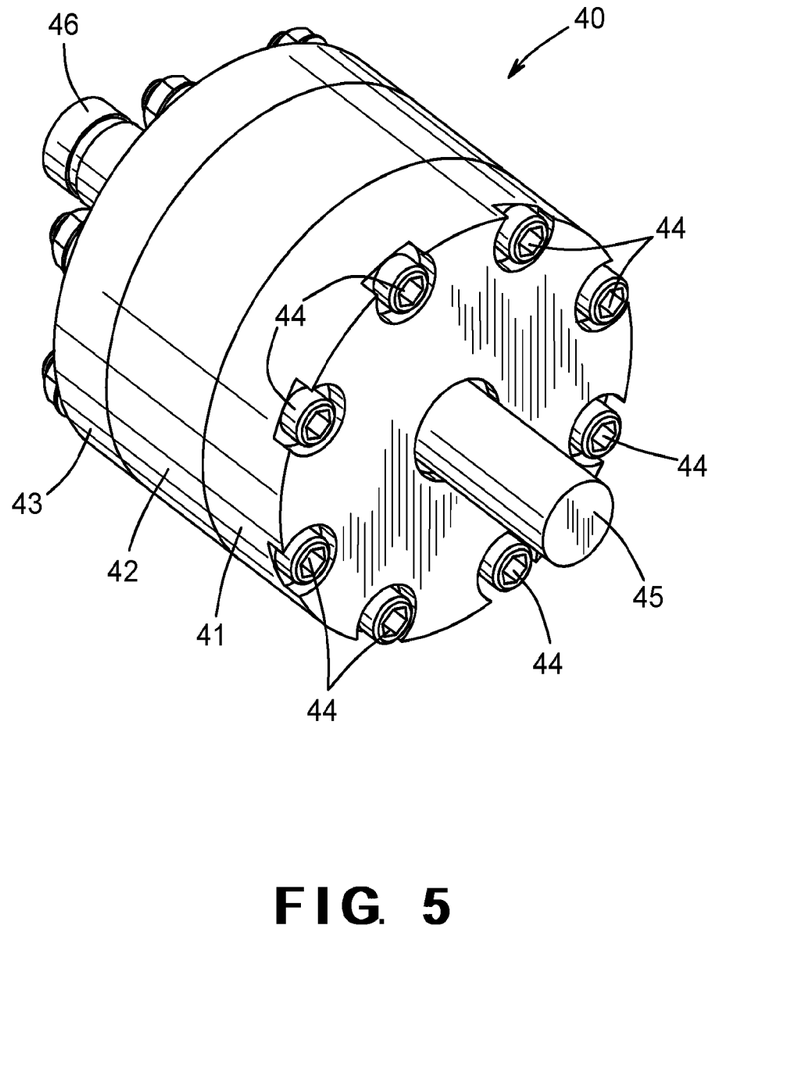
FIG. 5 is a perspective view of an exemplary viscous coupling of the viscous coupling and power take off assembly that can be used in the embodiments of the drive train system illustrated in FIGS. 1, 2, and 3.
Figure 6:
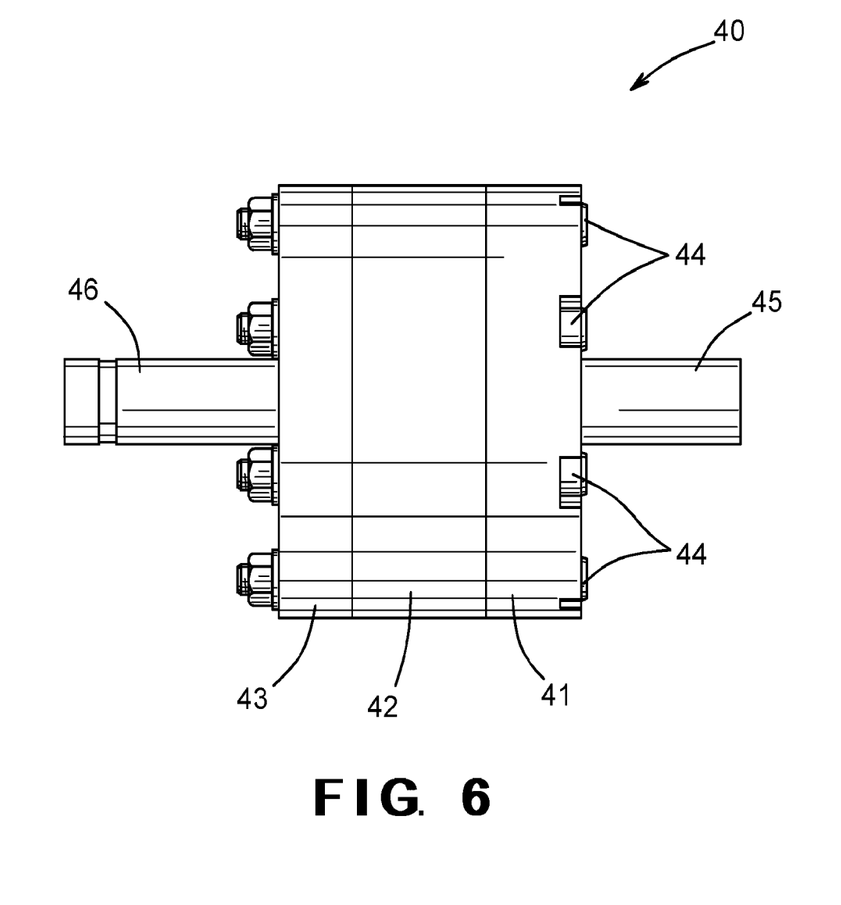
FIG. 6 is a side elevational view of the viscous coupling of the viscous coupling and power take off assembly illustrated in FIG. 5.

FIG. 4 is a sectional elevational view of the power take off 12 of the viscous coupling and power take off assembly that can be used in any of the embodiments of the drive train system 10, 20, and 30 illustrated in FIGS. 1, 2, and 3. The illustrated power take off 12 is intended to be representative of any structure for transferring rotational energy from the source of rotational energy 11 to the rotatably driven accessory 14. Thus, the scope of this invention is not intended to be limited for use with the specific structure for the power take off 12 illustrated in FIG. 1. On the contrary, as will become apparent below, this invention may be used in conjunction with any desired power take off structure.

As will be explained in greater detail below, the illustrated power take off 12 includes a housing, an input mechanism, and an output mechanism. The power take off housing is adapted to be supported on a housing (not shown) of the source of rotational energy 11. The input mechanism of the power take off 10 extends through an opening provided in the power take off housing into the housing of the source of rotational energy 11. In this manner, the input mechanism of the power take off 10 can be connected to the source of rotational energy 11 so as to be rotatably driven whenever the source of rotational energy 11 is operated, as described above. The output mechanism of the power take off 12 is rotatably driven by the input mechanism and is adapted to be connected to the rotatably driven accessory 14. In some instances, the input mechanism of the power take off 12 is directly connected to the output mechanism such that the rotatably driven accessory 14 is driven whenever the source of rotational energy 11 is operated. In other instances (such as shown in FIG. 4), a clutch assembly is provided between the input mechanism and the output mechanism such that the rotatably driven accessory is driven only when the clutch assembly is engaged while the source of rotational energy 11 is operated.

Referring specifically to FIG. 4, the illustrated power take off 12 includes a hollow housing 21 having a mounting surface 21a provided thereon. An opening 21b is provided through the mounting surface 21a of the power take off housing 21. An input gear 22 is rotatably supported within the power take off housing 21, and a portion of that input gear 22 extends through the opening 21b provided through the mounting surface 21a and outwardly from the power take off housing 21. The mounting surface 21a of the power take off housing 21 is adapted to be secured (typically by a plurality of bolts, not shown) to a corresponding mounting surface (not shown) provided on a housing (not shown) of the source of rotational energy 11, such as an engine or a transmission of a vehicle. As is well known in the art, the portion of the input gear 22 that extends through the opening 21b of the power take off housing 21 is adapted to extend within the housing of the source of rotational energy 11 and engage a corresponding gear (not shown) or other rotatably driven mechanism provided therein. Thus, the input gear 22 of the power take off 12 is rotatably driven whenever the gear or other mechanism contained within the source of rotational energy 11 is rotatably driven.

The illustrated input gear 22 is splined onto or otherwise supported on an input gear hub 23 for concurrent rotation. The input gear hub 23 is, in turn, rotatably supported on an input shaft 24 by a pair of roller bearings 25. First and second ends of the illustrated input shaft 24 are respectively (and preferably non-rotatably) supported in first and second bores 21c and 21d provided in the power take off housing 21. In the illustrated embodiment, each of the input shaft 24 and the first and second bores 21c and 21d is generally cylindrical in shape, although such is not required.

The illustrated power take off 12 also includes a clutch assembly, indicated generally at 26, for selectively the connecting the input gear hub 23 to an output shaft 27 for concurrent rotation. The output shaft 27 is, in turn, adapted to be connected to the rotatably driven accessory 14. The illustrated output shaft 27 is rotatably supported on the power take off housing 21 by a pair of tapered roller bearings 27a and 27b or other similar means. When the clutch assembly 26 is engaged, the input gear hub 23 is connected to the output shaft 27 for concurrent rotation. Thus, the rotatably driven accessory 14 is rotatably driven by the source of rotational power 11 when the clutch assembly 26 is engaged. Conversely, when the clutch assembly 26 is disengaged, the input gear hub 23 is disconnected from the output shaft 27. Thus, the rotatably driven accessory 14 is not rotatably driven by the source of rotational power 11 when the clutch assembly 26 is disengaged.

The specific structure and manner of operation of the clutch assembly 26 are conventional in the art and form no part of this invention. Thus, the clutch assembly 26 may be embodied as any desired structure for selectively the connecting the input gear hub 23 to the output shaft 27. A conventional engagement assembly, indicated generally at 28, may be provided to selectively engage and disengage the clutch assembly 26 in a known manner. If desired, the clutch assembly 26 may be omitted, and the input gear hub 23 may be constantly connected to the output shaft 27 for concurrent rotation.

FIGS. 5 through 10 illustrate a representative structure for a viscous coupling, indicated generally at 40, that can be used in the various embodiments of the drive train system illustrated in FIGS. 1, 2, and 3. The viscous coupling 40 includes a housing that, in the illustrated embodiment, includes a first end portion 41, a central portion 42, and a second end portion 43. The first end portion 41, the central portion 42, and the second end portion 43 of the housing are connected together by any conventional means, such as by the illustrated plurality of threaded fasteners 44. The first end portion 41, the central portion 42, and the second end portion 43 of the housing cooperate to define a fluid-tight interior space, the purpose of which will be explained below. In the illustrated embodiment, the central portion 42 of the housing is hollow and cylindrical in shape and defines the fluid-tight interior space, although such is not required.

Figure 9:
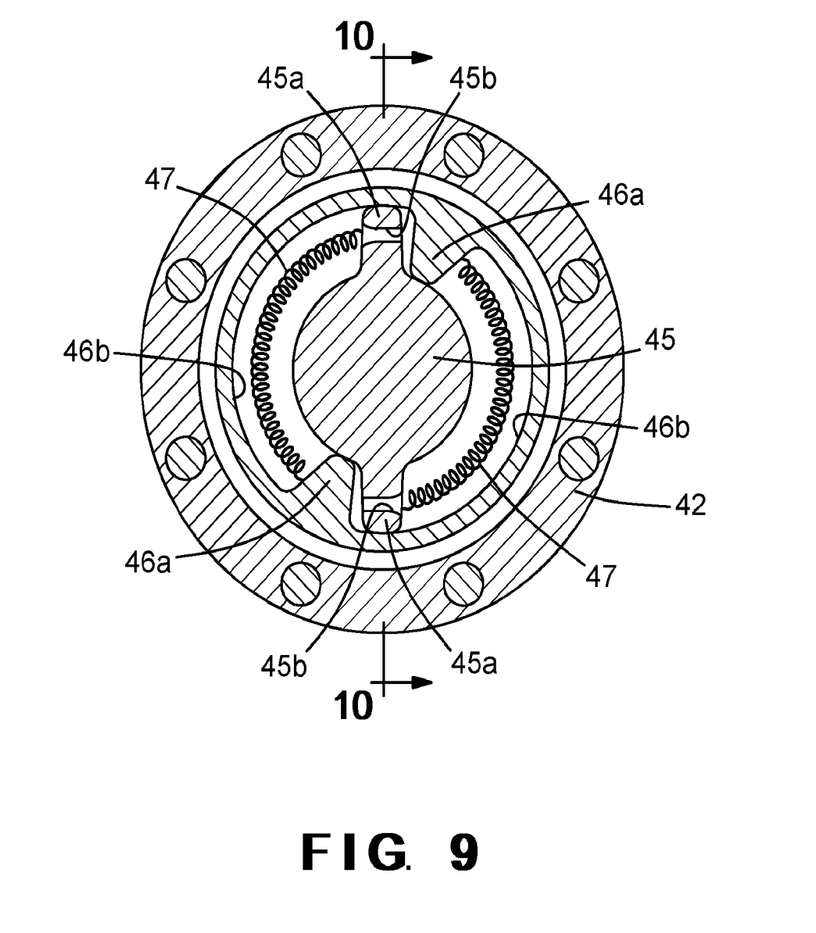
FIG. 9 is a schematic sectional elevational view taken along line 9-9 of FIG. 8.
Figure 10:
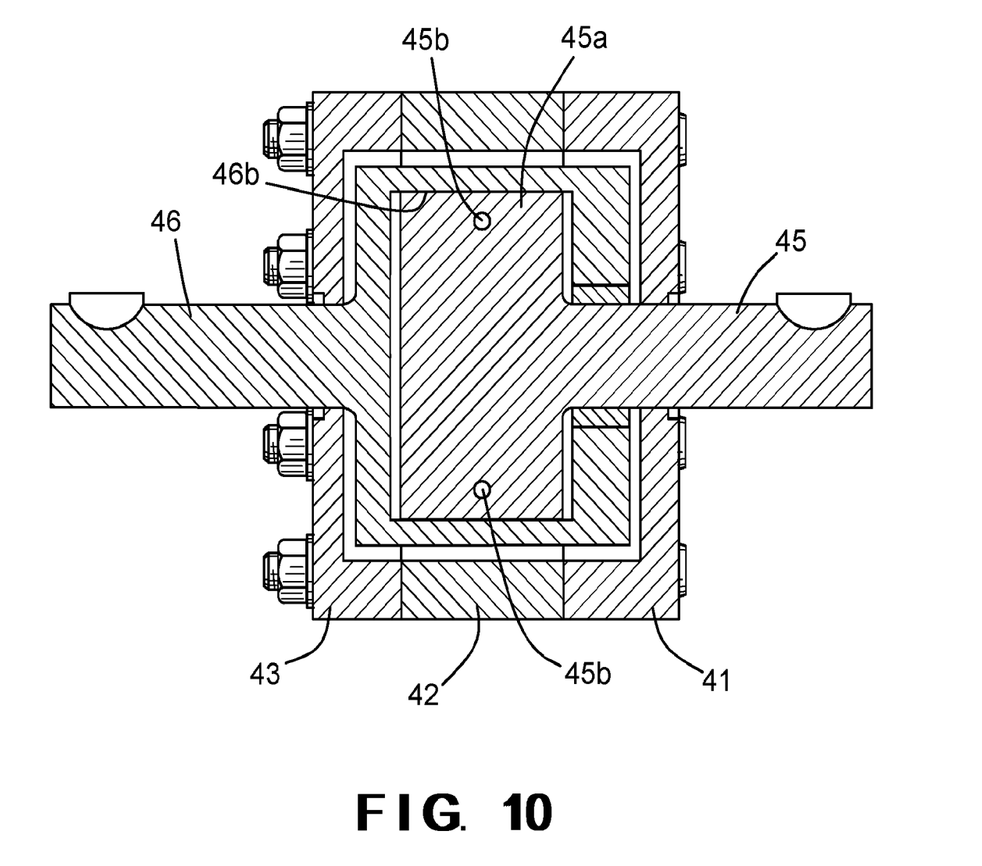
FIG. 10 is a schematic sectional elevational view taken along line 10-10 of FIG. 9.

The viscous coupling 40 also includes a first shaft 45, which is referred to herein as an input shaft 45 for the sake of clarity. However, it will be appreciated that the viscous coupling 40 may be arranged in the drive train system 10 such that the first shaft 45 functions as an output shaft of the viscous coupling 40. The input shaft 45 may be supported on the first end portion 41 of the housing (such as by a roller bearing or similar structure, not shown) or otherwise for rotation relative to the housing of the viscous coupling 40, although such is not required. The input shaft 45 has a pair of opposed outwardly extending protrusions 45a provided thereon. However, a greater or lesser number of such outwardly extending protrusions 45a may be provided as desired. The outwardly extending protrusions 45a are disposed within the fluid-tight interior space defined, in the illustrated embodiment, primarily by the central portion 42 of the housing of the viscous coupling 40, although such is not required. If desired, some or all of the outwardly extending protrusions 45a may have one or more circumferentially extending orifices 45b formed therethrough, as shown in FIGS. 9 and 10. The purpose for such orifices 45b will be explained below.

The viscous coupling 40 further includes a second shaft 46, which is referred to herein as an output shaft 46 for the sake of clarity. However, it will be appreciated that the viscous coupling 40 may be arranged in the drive train system 10 such that the second shaft 46 functions as an input shaft of the viscous coupling 40. The output shaft 46 may be supported on the second end portion 43 of the housing of the viscous coupling 40 (such as by a roller bearing or similar structure, not shown) or otherwise for rotation relative thereto, although such is not required. The output shaft 46 has a hollow cylindrical end portion 46a provided thereon that is disposed within the fluid-tight interior space defined, in the illustrated embodiment, primarily by the central portion 42 of the housing of the viscous coupling 40, although such is not required. The hollow cylindrical end portion 46a of the output shaft 46 has a pair of opposed circumferentially extending recesses 46b provided therein. However, a greater or lesser number of such circumferentially extending recesses 46b may be provided as desired.

Figure 7:
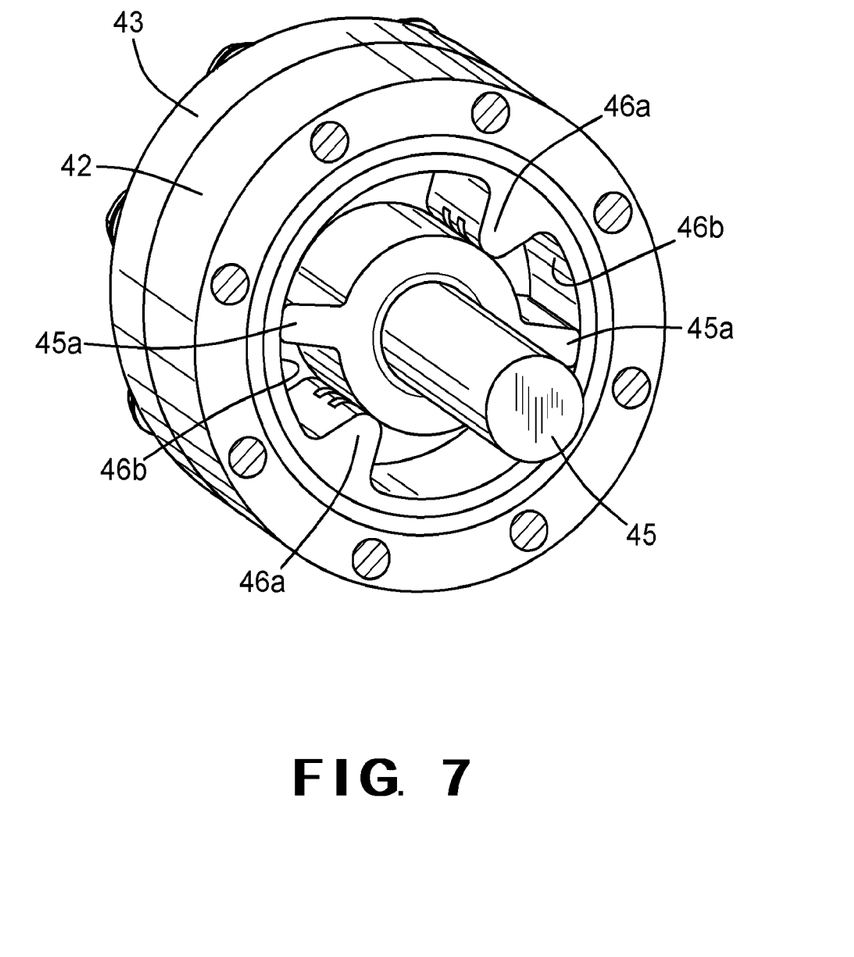
FIG. 7 is a perspective view showing some of the internal portions of the viscous coupling of the viscous coupling and power take off assembly illustrated in FIGS. 5 and 6 in a first orientation relative to one another.
Figure 8:
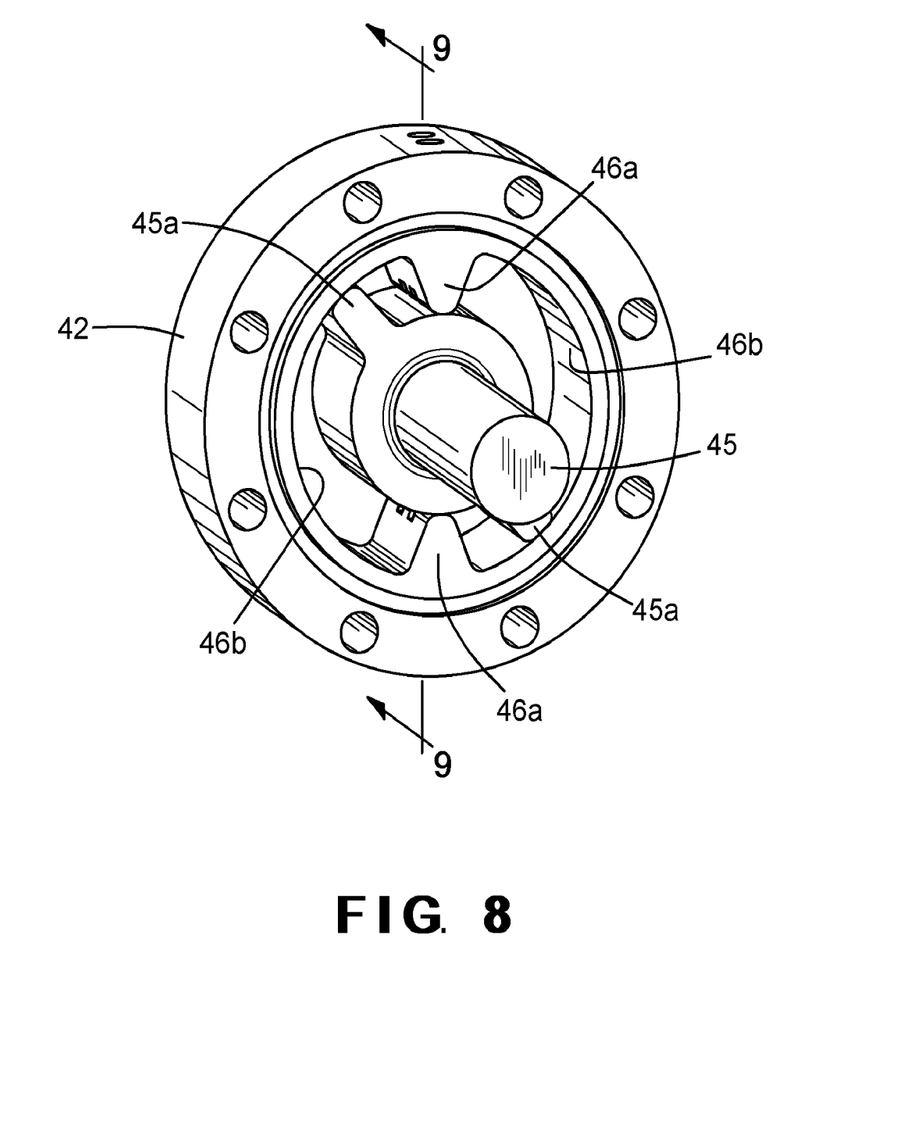
FIG. 8 is a perspective view showing some of the internal portions of the viscous coupling of the viscous coupling and power take off assembly illustrated in FIGS. 5 and 6 in a second orientation relative to one another.

As best shown in FIGS. 7 and 8, the outwardly extending protrusions 45a provided on the input shaft 45 are disposed within the circumferentially extending recesses 46b of the hollow cylindrical end portion 46a of the output shaft 46. The circumferential extents of the outwardly extending protrusions 45a provided on the input shaft 45 are smaller that the circumferential extents of the corresponding circumferentially extending recesses 46b of the hollow cylindrical end portion 46a of the output shaft 46. Thus, the outwardly extending protrusions 45a provided on the input shaft 45 cooperate with the circumferentially extending recesses 46b of the hollow cylindrical end portion 46a of the output shaft 46 to define a lost motion type of connection between the input shaft 45 and the output shaft 46. In other words, relative rotational movement between the input shaft 45 and the output shaft 46 is permitted to a limited extent, which is defined by the relative sizes of the protrusions 45a provided on the input shaft 45 and the circumferentially extending recesses 46b of the hollow cylindrical end portion 46a of the output shaft 46.

The fluid-tight interior space defined, in the illustrated embodiment, primarily by the central portion 42 of the housing of the viscous coupling 40 is filled with a fluid. The fluid is preferably a relatively viscous fluid, such as a heavyweight silicone or petroleum grease, but may also be ambient air or any other desired fluid. Relative rotational movement between the input shaft 45 and the output shaft 46 can be controlled by varying the magnitude of viscosity of the fluid contained in this fluid-tight interior space, which resists (but does not prohibit) such relative rotational movement as it passes through the orifices 45b or otherwise. Relative rotational movement between the input shaft 45 and the output shaft 46 can also be controlled by varying the sizes and shapes of the orifices 45b provided through some or all of the outwardly extending protrusions 45a.

The orifices 45b may be embodied in any desired manner. For example, as best shown in FIG. 9, the orifices 45b may be embodied as simple bores that extend from one circumferential face of the protrusions 45a provided on the input shaft 45 to the other circumferential face. If desired, one or more interchangeable orifice fittings (not shown) of varying sizes may be disposed within some or all of the orifices 45b to adjust the ability of the viscous fluid to flow therethrough. Alternatively, one or more set screws (not shown) or other structures may be provided on the protrusions 45a provided on the input shaft 45 to selectively extend within the orifices 45b, acting as gate valves to variably control the ability of the viscous fluid to flow therethrough. Lastly, an electromagnetically or otherwise externally controllable valve (not shown) may be disposed within some or all of the orifices 45b to adjust the ability of the viscous fluid to flow therethrough. Although the described and illustrated embodiments provide the flow control structures on the protrusions 45a of the input shaft 45, it will be appreciated that such flow control structures may alternatively be provided on the output shaft 46.

FIG. 9 illustrates the relative orientation of the input shaft 45 and the output shaft 46 of the viscous coupling 40 when no torque is being transmitted therethrough from the source of rotational energy to the rotatably driven device. One or more springs 47 may be provided to urge the input shaft 45 to a first rotational position relative to the output shaft 46. In this first relative rotational position, the outwardly extending protrusions 45a abut first ends of the outwardly extending recesses 46b of the hollow cylindrical end portion 46a of the output shaft 46 because of the urging of the springs 47. When torque is subsequently transmitted through the viscous coupling 40 from the source of rotational energy 11 to the rotatably driven device 14, the input shaft 45 will rotate relative to the output shaft 46 (counter-clockwise when viewing FIG. 9) from the first relative rotational position, against the resistance of the viscous fluid and the urgings of the spring 47. At some point, the input shaft 45 will rotate relative to the output shaft 46 from the first relative rotational position to a second relative rotational position, wherein the outwardly extending protrusions 45a abut second (opposite) ends of the outwardly extending recesses 46b of the hollow cylindrical end portion 46a of the output shaft 46. At that point, a direct mechanical connection is provided from the input shaft 45 to the output shaft 46. Between the first and second relative rotational positions, the input shaft 45 rotatably drives the output shaft 46 through the springs 47.

Thus, the viscous coupling 40 of this invention will reduce or eliminate torque transients that may be generated within and transmitted through the drive train system 10, 20, or 30 from the source of rotational energy 11 to the rotatably driven accessory 14. This can occur, for example, when the source of rotational energy 11 is abruptly actuated or when the clutch assembly 26 of the power take off 12 is abruptly engaged to transmit rotational energy to the rotatably driven accessory 14. When torque is subsequently discontinued to be transmitted through the viscous coupling 40 from the source of rotational energy 11 to the rotatably driven device 14, the input shaft 45 will rotate relative to the output shaft 46 (clockwise when viewing FIG. 9) from the second relative rotational position back to the first relative rotational position under the urgings of the spring 47.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A drive train system comprising:
   a source of rotational energy;
   a combined viscous coupling and power take off assembly that is rotatably driven by the source of rotational energy, the combined viscous coupling and power take off assembly being integrated into a single hollow housing; and
   a rotatably driven device that is rotatably driven by the combined viscous coupling and power take off assembly.

2. The drive train system defined in claim 1 wherein the single hollow housing of the combined viscous coupling and power take off assembly includes a mounting surface that is supported on the source of rotational energy, an opening provided through the mounting surface, and an input gear rotatably supported within the single hollow housing of the combined viscous coupling and power take off assembly such that a portion of the input gear extends outwardly through the opening provided through the mounting surface and into engagement with a portion of the source of rotational energy.

3. The drive train system defined in claim 1 wherein the viscous coupling includes an input shaft that is connected to an output shaft through a lost motion type of connection.

4. The drive train system defined in claim 1 wherein the viscous coupling includes an input shaft that is connected to an output shaft through a lost motion type of connection including a fluid.

5. The drive train system defined in claim 1 wherein the viscous coupling includes an input shaft that is connected to an output shaft through a lost motion type of connection including a viscous fluid that resists relative rotational movement between the input shaft and the output shaft.

6. The drive train system defined in claim 1 wherein the viscous coupling includes an input shaft that is connected to an output shaft through a lost motion type of connection including a viscous fluid that resists relative rotational movement between the input shaft and the output shaft as it passes through one or more orifices provided in either or both of the input shaft and the output shaft.

7. The drive train system defined in claim 1 wherein the viscous coupling includes an input shaft having an input shaft protrusion and an output shaft having an output shaft protrusion, wherein the input shaft protrusion and the output shaft protrusion cooperate to define a lost motion type of connection between the input shaft and the output shaft.

8. The drive train system defined in claim 7 wherein the viscous coupling includes a housing having an interior space within which the input shaft protrusion and the output shaft protrusion are disposed.

9. The drive train system defined in claim 8 wherein the interior space of the housing of the viscous coupling is fluid-tight, and wherein the interior space of the housing of the viscous coupling is filled with a fluid.

10. The drive train system defined in claim 9 wherein one or more orifices extend through either or both of the input shaft protrusion and the output shaft protrusion to allow the fluid to flow therethrough when relative rotational movement occurs between the input shaft and the output shaft.

11. The drive train system defined in claim 1 wherein the viscous coupling includes an input shaft having a plurality of input shaft protrusions and an output shaft having a plurality of output shaft protrusions, wherein the plurality of input shaft protrusions and the plurality of output shaft protrusions cooperate to define a lost motion type of connection between the input shaft and the output shaft.

12. The drive train system defined in claim 11 wherein the viscous coupling includes a housing having an interior space within which the plurality of input shaft protrusions and the plurality of output shaft protrusions are disposed.

13. The drive train system defined in claim 12 wherein the interior space of the housing of the viscous coupling is fluid-tight, and wherein the interior space of the housing of the viscous coupling is filled with a fluid.

14. The drive train system defined in claim 13 wherein one or more orifices extend through each of the plurality of input shaft protrusions and the plurality of output shaft protrusions to allow the fluid to flow therethrough when relative rotational movement occurs between the input shaft and the output shaft.

* * * * *